United States Patent Office 3,135,769
Patented June 2, 1964

3,135,769
2-(5-NITRO-2-FURYL)-4-OXO-1,3-DIOXOLANE - 5,5-DIACETIC ACID AND DERIVATIVES THEREOF
Michael M. Besso, New London, Conn., assignor to Chas. Pfizer & Co., Inc., New York, N.Y., a corporation of Delaware
No Drawing. Filed Feb. 20, 1963, Ser. No. 260,034
8 Claims. (Cl. 260—340.2)

This invention deals with new compositions of matter having therapeutic properties. More particularly, it deals with 2-(5-nitro-2-furyl)-4-oxo-1,3-dioxolane-5,5-diacetic acid, lower alkyl esters thereof and the anhydride thereof.

The compounds of the present invention may be represented by the following formula:

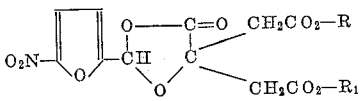

wherein R and $R_1$ each may be hydrogen or a lower alkyl radical such as methyl, ethyl, isopropyl and the like. It is to be understood that the above-indicated formula also includes the anhydride.

It has been found that the compounds of the formula hereinbefore disclosed exhibit unexpected biological activity, and more particularly, that these compounds exhibit antifungal and antibacterial activity. Furthermore, the compounds are shown to exhibit growth promoting activity, especially in poultry. This permits their application in therapeutics, veterinary medicine, industry and agriculture. The compounds may be used in ointments and lotions for treatment of human and animal skin infections of fungal etiology. They may be used in sprays and dusts for agricultural applications, and they may be used in industrial applications as preservatives for fuels and oils.

These compounds may be employed in any of the forms conventionally employed for the application of antifungal agents. The compounds may be dispersed in a variety of ways. For example, they may be dispersed on an inert finely divided solid and employed as a dust. Suitable solid carriers include clay, talc, bentonite, as well as other carriers familiar to those in the art. The compounds also be applied as a spray in a liquid carrier either as a solution in a solvent or as a suspension in a non-solvent such as water. Suitable wetting agents may be incorporated when said compounds are applied as a suspension. The compounds may be used alone, mixed together, or mixed with carriers that are themselves active, such as other parasiticides, herbicides, etc.

When the compounds of the instant invention are used as antibacterial agents, it is to be noted that they may be administered either alone or in combination with pharmaceutically acceptable carriers by either the oral or parenteral route of administration, and that such administration can be carried out in both single and multiple dosages.

In connection with the use of the compounds of this invention as a growth promoter in animals, such as poultry, it is to be noted that the preferred mode of administration is orally, and that such administration may be effectively carried out by the use of capsules, boluses, drench solutions and by incorporating said compounds in the feed to be consumed by the animal.

The compounds of the present invention are readily prepared by the reaction of citric acid with 5-nitrofuranmethanediol diacetate to form the free acid, followed by an esterification reaction to form the ester. A preferred procedure for the preparation of these compounds comprises reacting substantially equimolar quantities of the reactants in the presence of a Lewis acid such as sulfuric acid.

The reaction to prepare the free acid may be illustrated as follows:

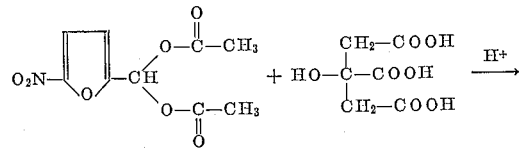

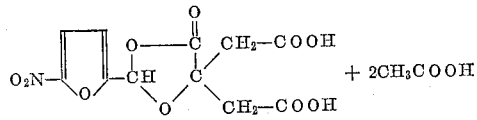

This reaction can be effectively carried out at temperatures of from about 110° to about 160° C. Preferred temperatures are at about the melting points of the mixture of the solid reactants. The time for carrying out the reaction is dependent upon the rate and temperature of heating. However, the reaction should be continued at least until a homogeneous mixture is obtained.

The esters are readily prepared by reacting the free acid with the appropriate alcohol in the presence of a Lewis acid such as sulfuric acid. The reaction can be satisfactorily carried out at substantially the reflux temperatures of the alcohol. If substantially two moles of alcohol are used per mole of diacid, the process will readily form the corresponding diester. Conversely, the monoester, mixtures of mono- and diesters or mixtures of acid and monoester are readily formed by using an appropriate amount of alcohol.

When preparing the esters by reacting the free acid with an appropriate alcohol, it may be desirable to add an appropriate solvent, such as benzene, for example, to facilitate removal of the water by azeotropic means. It is to be understood, however, that the azeotropic solvent need not be employed.

The ester compounds of the instant invention may also be prepared by reacting substantially molar equivalents of the appropriate diester or triester of citric acid with 5-nitrofuranmethanediol diacetate. In the instance where the diester is used, it is preferred to use the symmetrical diester of citric acid. It has been found that when the symmetrical diester of citric acid is used, larger yields are obtainable, and the reaction proceeds more smoothly.

The compounds prepared by the reactions as set forth hereinbefore can be isolated and purified by methods well known to those skilled in the art. For example, the free acid may be extracted from the reaction mixture by a solvent such as ethyl acetate and recrystallized from solvents such as hexane and mixtures of ethylene dichloride-methanol. The diesters may be extracted from the reaction mixture with chloroform and recrystallized from solvents such as methanol, hexane and ether-pentane mixtures. When the product is only partially esterified, an appropriate mixture of these two classes of solvents will be selected.

The compounds of this invention are active against a wide variety of microorganisms. Their high level of activity against a number of microorganisms responsible for certain diseases makes them ideally suitable as antifungal agents. The free acid, while exhibiting antifungal activity, showed essentially no anti-bacterial activity. However, it was found that the urine obtained from rats which had been given the free acid either orally or parenterally showed anti-bacterial activity. It has not been established what happens to the free acid as it passes through the rat.

The following tests in vitro indicate the utility of the novel compounds of this invention as biologically active agents, particularly useful as anti-fungal agents. These tests were conducted by seeding agar slants containing various concentrations of the pure compound with the particular organism specified. The "minimum inhibitory concentration" (MIC) indicated in Table I is the minimum concentration of the compound in micrograms/milliliter at which growth of the microorganism failed to occur. The values represent ten-fold serial dilutions.

TABLE I.—ANTIBACTERIAL AND ANTIFUNGAL ACTIVITY OF SOME COMPOUNDS

| Organism | MIC (mcg./ml.) | | | |
|---|---|---|---|---|
| | Free acid | Dimethyl ester | Diethyl ester | Diisopropyl ester |
| Salmonella typhosa | NT | 3.0 | 25 | 1.5 |
| Proteus vulgaris | — | 6.3 | 12.5 | 3.0 |
| Escherichia coli | — | 0.39 | 6.3 | 0.39 |
| Pseudomonas aeruginosa | — | 50 | 100 | 6.3 |
| Streptococcus pyogenes | — | 50 | 12.5 | 25 |
| Micrococcus pyogenes var. aureus | — | 100 | 100 | 25 |
| Aerobacter aerogenes | NT | 6.3 | 25 | 6.3 |
| Candida albicanus | 1,000 | — | 1,000 | 1,000 |
| Trichophyton rubrum | 100 | 1,000 | 100 | 1,000 |
| Alternaria solani | >1,000 | 1,000 | >1,000 | 1,000 |
| Aspergillus niger | 10 | >1,000 | >1,000 | >1,000 |
| Penicillium funiculosum | >1,000 | — | — | 1,000 |

NT = no test.
(—) = tested but inactive.

The growth promoting activity of the instant compounds is demonstrated by diisopropyl-2-(5-nitro-2-furyl)-4-oxo-1,3-dioxolane-5,5-diacetate. Day-old broiler-type chicks (10 chicks per group) were fed a basal ration for a period of three weeks. A typical basal ration is as follows:

Ingredient: Percent
- Yellow corn meal _____ 56.65
- Soybean oil meal (50% protein) _____ 33.75
- Alfalfa meal (17% protein) _____ 2.00
- Stabilized animal fat _____ 3.50
- Multi-Phoss (dicalcium phosphate) _____ 2.00
- Iodized salt _____ 0.50
- Trace mineral-vitamin pre-mix _____ 0.60
- Limestone _____ 1.00

This ration contained 0.1% by weight of the instant compound as fed to the experimental chicks. The controls received only the basal ration without the compound. The chicks were weighed on the seventh day and the last day of the experiment. The growth index was determined on the basis of 100% as the index for the controls. Chicks fed the basal ration containing diisopropyl-2-(5-nitro-2-furyl)-4-oxo-1,3-dioxolane-5,5-diacetate showed a growth index of 106%.

The synthesis of 2-(5-nitro-2-furyl)-4-oxo-1,3-dioxolane-5,5-diacetic acid and derivatives thereof are more fully illustrated in the following examples. It is to be understood that the examples are given solely for the purpose of illustration only and are not to be construed as limitations of this invention, many apparent variations of which are possible without departing from the spirit or scope thereof.

*Example I*

2-(5-NITRO-2-FURYL)-4-OXO-1,3-DIOXOLANE-5,5-DIACETIC ACID

Into a 1-liter, 3-neck flask equipped with a nitrogen inlet, condenser and stirrer are placed 195.2 g. (0.8 mole) of 5-nitrofuranmethanediol diacetate. The oil-bath temperature is raised to 120° C. and the compound is melted. 157.6 g. (0.82 mole) of anhydrous citric acid and 12 drops of concentrated sulfuric acid are added, and the mixture stirred for 1 hour. A water aspirator is attached and the acetic acid distilled at an oil-bath temperature of 115° C. To the reaction mixture are added 400 ml. of water followed by extraction with four 500-ml. portions of ethyl acetate. The ethyl acetate extracts are combined, treated with charcoal, filtered and dried over anhydrous magnesium sulfate. The extracts are filtered, and the ethyl acetate is removed by means of a rotating evaporator. The oily residue remaining is washed with three 200-ml. portions of chloroform and left standing. The crude solid which precipitates is filtered and recrystallized from an ethyl acetate-hexane mixture to yield a yellowish-green solid melting at 164–165° C. The compound is insoluble in chloroform, hexane and cold water, moderately soluble in hot water, and soluble in ethyl acetate.

The analysis for $C_{11}H_9O_{10}N$ is: Calculated: C, 41.9; H, 2.9; N, 4.5. Found: C, 42.0; H, 3.2; N, 4.6.

The procedure of this example can be improved by seeding the oily residue with previously obtained crystals of the diacid.

*Example II*

DIMETHYL-2-(5-NITRO-2-FURYL)-4-OXO-1,3-DIOXOLANE-5,5-DIACETATE

The free acid (10 g.) of Example I, 50 ml. methanol, 15 ml. benzene and 4 drops of concentrated sulfuric acid are placed in a flask and refluxed for 22 hours. The solution is evaporated to dryness on a rotating evaporator. The solid is recrystallized from methanol and dried. The compound is a yellowish-green solid, melting at 118°–119° C., insoluble in water and hexane, and soluble in chloroform.

The analysis for $C_{13}H_{13}O_{10}N$ is: Calculated: C, 45.5; H, 3.8; N, 4.1. Found: C, 45.6; H, 4.0; N, 4.3.

*Example III*

ANHYDRIDE OF 2-(5-NITRO-2-FURYL)-4-OXO-1,3-DIOXOLANE-5,5-DIACETIC ACID

The free acid (3.15 g.) of Example I, 10 ml. acetic anhydride and 2 drops of concentrated sulfuric acid are heated at 100° C. for 2 hours. The solution is allowed to stand for 12 hours, after which it is evaporated to dryness yielding a dark brown oil. The oil is taken up in 100 ml. of chloroform, treated with charcoal and filtered. The chloroform is removed by evaporation. The solid remaining is recrystallized from hexane yielding a product melting at 135°–136° C.

The analysis for $C_{11}H_7O_9N$ is: Calculated: C, 44.4; H, 2.4; N, 4.7. Found: C, 44.2; H, 2.5; N, 4.7.

*Example IV*

DIETHYL-2-(5-NITRO-2-FURYL)-4-OXO-1,3-DIOXOLAN-5,5-DIACETATE

The procedure of Example II is followed using ethanol instead of methanol to yield diethyl-2-(5-nitro-2-furyl)-4-oxo-1,3-dioxolane-5,5-diacetate.

*Example V*

DIISOPROPYL-2-(5-NITRO-2-FURYL)-4-OXO-1,3-DIOXOLANE-5,5-DIACETATE

Fifty grams of 2-(5-nitro-2-furyl)-4-oxo-1,3-dioxolane-5,5-diacetic acid, 835 ml. of isopropyl alcohol and 1 g. toluenesulfonic acid are placed in a two-liter flask and the mixture refluxed for 22½ hours. The mixture is then subjected to vacuum distillation to remove any unreacted isopropyl alcohol. The residue is extracted with two 200-ml. portions of chloroform. The chloroform is removed by distillation and the crude product remaining is distilled at 100°–112° C. at 0.2–0.4 mm. pressure to remove any triisopropyl citrate. The residue remaining is taken up in an ether-pentane mixture. The product crystallizes out melting at 90°–92° C. and is insoluble in water and hexane, and soluble in chloroform.

The analysis for $C_{17}H_{21}O_{10}N$ is: Calculated: C, 51.1; H, 5.3; N, 3.5. Found: C, 51.1; H, 5.1; N, 3.5.

*Example VI*

DIISOPROPYL-2-(5-NITRO-2-FURYL)-4-OXO-1,3-DIOXOLANE-5,5-DIACETATE

Into a 250 ml. flask are placed 31.8 g. (0.1 mole) of triisopropyl citrate, 24.3 g. (0.1 mole) of 5-nitrofuranmethanediol diacetate and 3 drops of concentrated sulfuric acid. The mixture is heated with stirring until solution occurs, after which the solution is refluxed for 16 hours. The solution is distilled under reduced pressure to remove acetic acid and isopropyl alcohol. The residue is extracted with 350 ml. of hexane. The hexane is removed by distillation, and the crude product is taken up in an ether-pentane mixture. The product crystallizes out melting at 90°–92° C. The analysis corresponds to the analysis of Example V.

What is claimed is:

1. A member selected from the group consisting of 2-5 - nitro - 2 - furyl) - 4 - oxo - 1,3 - dioxolane - 5,5 - diacetic acid, lower alkyl esters thereof and the anhydride thereof.

2. 2 - (5 - nitro - 2 - furyl) - 4 - oxo - 1,3 - dioxolane-5,5-diacetic acid.

3. Dimethyl - 2 - (5 - nitro - 2 furyl) - 4 - oxo - 1,3-dioxolane-5,5-diacetate.

4. Diethyl - 2 - (5 - nitro - 2 - furyl) - oxo - 1,3 - dioxolane-5,5-diacetate.

5. Diisopropyl - 2 - (5 - nitro - 2 - furyl) - 4 - oxo - 1,3-dioxolane-5,5-diacetate.

6. A process for the preparation of 2-(5-nitro-2-furyl) - 4 - oxo - 1,3 - dioxolane - 5,5 - diacetic acid which comprises contacting substantially equimolar quantities of citric acid and 5-nitrofuranmethanediol diacetate in the presence of a Lewis acid at substantially the temperature of the melting point of the mixture of the reactants, and thereafter separating the acid formed.

7. A process for the preparation of the lower alkyl esters of 2-(5-nitro-2-furyl)-4-oxo-1,3-dioxolane-5,5-diacetic acid which comprises the steps of contacting substantially equimolar quantities of citric acid and 5-nitrofuranmethanediol diacetate in the presence of a Lewis acid at temperatures of from about 110° C. to about 160° C.; thereafter reacting the acid formed with a lower alcohol in substantially 1:2 mole ratio quantities, respectively, in the presence of a Lewis acid at substantially reflux temperatures.

8. A process for the preparation of the lower alkyl esters of 2-(5-nitro-2-furyl)-4-oxo-1,3-dioxolane-5,5-diacetic acid which comprises contacting substantially equimolar quantities of a compound selected from the group consisting of the lower alkyl diesters and lower alkyl triesters of citric acid with 5-nitrofuranmethanediol diacetate in the presence of a Lewis acid at substantially the temperature of the melting point of the mixture of the reactants, and thereafter separating the ester formed.

References Cited in the file of this patent

Noller: Chemistry of Organic Compounds, 2d ed., pp. 166–169 (1957).